(12) United States Patent
Wang et al.

(10) Patent No.: US 8,279,790 B2
(45) Date of Patent: Oct. 2, 2012

(54) PACKET BUFFERING BASED AT LEAST IN PART UPON PACKET RECEIPT TIME INTERVAL WEIGHTED MOVING AVERAGE

(75) Inventors: Ren Wang, Portland, OR (US);
Tsung-Yuan C. Tai, Portland, OR (US);
Christian Maciocco, Portland, OR (US);
Shian Tsai, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 12/722,186

(22) Filed: Mar. 11, 2010

(65) Prior Publication Data

US 2011/0222397 A1    Sep. 15, 2011

(51) Int. Cl.
*G08C 17/00* (2006.01)
(52) U.S. Cl. ............... 370/311; 370/229; 455/343.2
(58) Field of Classification Search .......... 370/229, 370/311; 455/343.2
See application file for complete search history.

(56) References Cited

U.S. PATENT DOCUMENTS

| | | | | |
|---|---|---|---|---|
| 2008/0062865 | A1* | 3/2008 | Neugebauer | 370/229 |
| 2009/0077401 | A1 | 3/2009 | Tsai, Jr. | |
| 2009/0325533 | A1* | 12/2009 | Lele et al. | 455/343.1 |
| 2010/0080133 | A1* | 4/2010 | Oron | 370/252 |

OTHER PUBLICATIONS

Intel, "Intel® Ethernet Controllers and PHYs", 2009, 2 Pages. Document available at: http:// intel.com/go/ethernet.
Kulkarni, A. et al., "IDC: An Energy Efficient Communication Scheme for Connected Mobile Platforms", IEEE Communications Society, manuscript received for publication, Sep. 17, 2009, 6 Pages.
Intel, "Intel® Microarchitecture and 10 Gigabit Ethernet Transforming the Data Center", White Paper, 2009, pp. 1-8.
Intel, "Intel® 10 Gigabit AT2 Server Adapter",10 Gigabit BASE-T Ethernet Server Adapters Designed for Multi-Core Processors and Optimized for Virtualization, Product Brief, 2009, 4 Pages.
Intel, "New Trends Make 10 Gigabit Ethernet the Data-Center Performance Choice", White Paper, Intel Server Adapters, 2007, 8 Pages.

* cited by examiner

*Primary Examiner* — Luat Phung
(74) *Attorney, Agent, or Firm* — Christopher K. Gagne

(57) ABSTRACT

An embodiment may include circuitry to be comprised in a node. The node may be communicatively coupled to a network and may include a host processor to execute at least one communication protocol-related process. The circuitry may determine, at least in part, whether to buffer, at least in part, at least one packet received from the network based at least in part upon whether a weighted moving average exceeds a first threshold and is less than a second threshold. The average may be determined based at least in part upon one or more time intervals between one or more packet receptions from the network. Many alternatives, variations, and modifications are possible.

12 Claims, 4 Drawing Sheets

PACKET BUFFERING BASED AT LEAST IN PART UPON PACKET RECEIPT TIME INTERVAL WEIGHTED MOVING AVERAGE

FIELD

This disclosure relates to packet buffering that is based at least in part upon a weighted moving average of one or more time intervals between packet receipts.

BACKGROUND

In one conventional computing arrangement, a first network node transmits packets to and receives packets from a second network node via a network. The first node is a mobile computer that includes a battery to power the first node. In order to try to reduce the first node's power consumption, and thereby extend the first node's battery life, the first node implements a power utilization scheme in which its central processing unit (CPU) and/or network communication components are put into a reduced power state (e.g., relative to a fully powered up state) when the CPU and/or components are not actively in use processing packets received and/or to be transmitted via the network. When the first node receives a packet, one or more interrupts may be generated that may result in the CPU and/or these components being returned to a fully powered up state to permit the CPU and/or these components to process the received packet.

In operation, packets may be received by the first node according to a non-deterministic timing, thereby resulting in such interrupts being generated at a correspondingly non-deterministic timing. This may result in the first node's central processing unit and/or network communication components undergoing frequent, non-deterministically timed power state transitions. This may reduce the efficacy of the power utilization scheme in reducing the first node's power consumption. It may also reduce the first node's efficiency in processing certain types of packet traffic.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
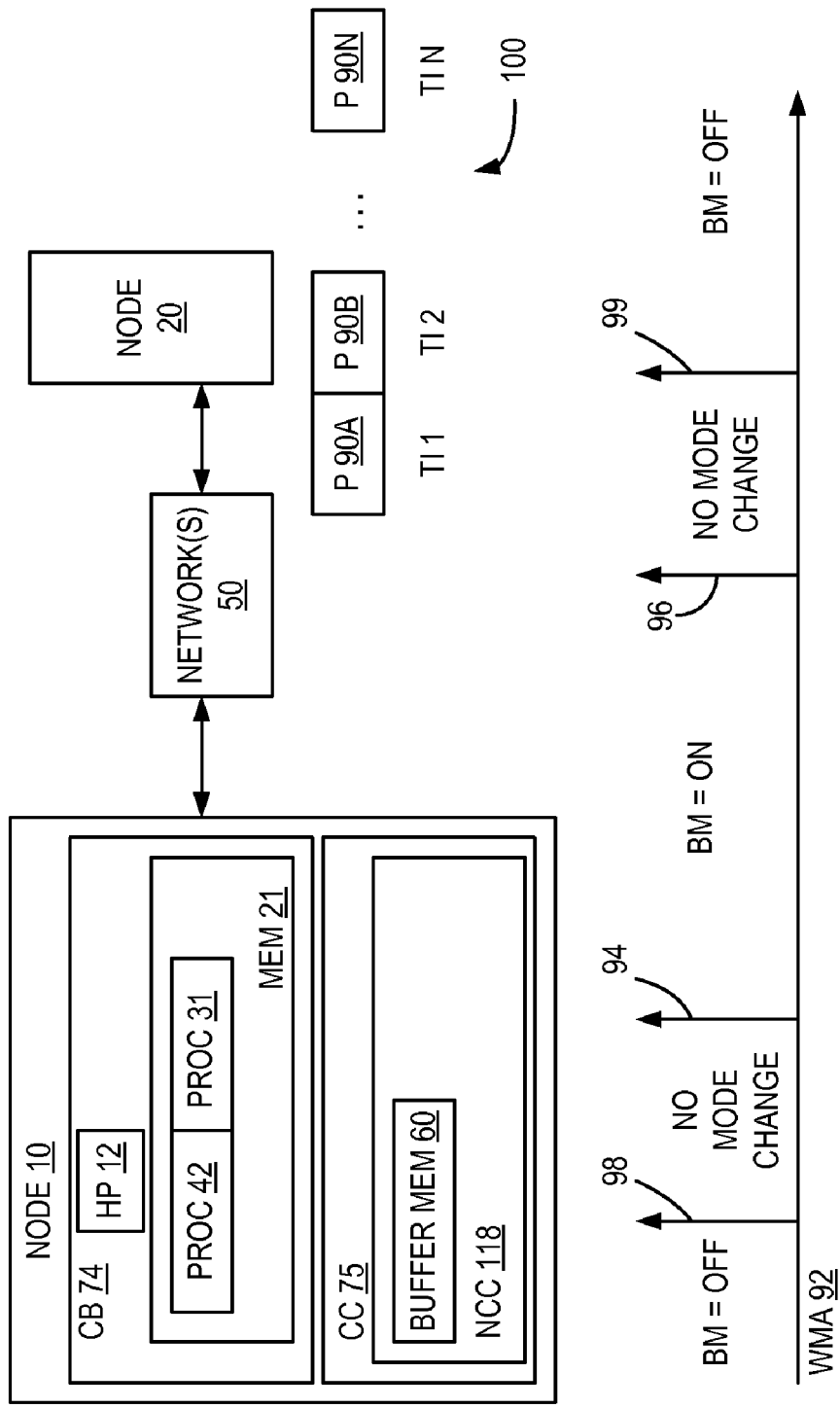
FIG. 1 illustrates a system embodiment.

FIG. 1 illustrates a system embodiment 100. System 100 may include node 10 that may be communicatively coupled to node 20 via one or more wireless and/or wired networks 50. Each of the nodes 10 and 20 may be geographically remote from each other. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Node 10 may comprise circuit board (CB) 74 and circuit card (CC) 75. In this embodiment, CB 74 may comprise, for example, a system motherboard that may be physically and communicatively coupled to CC 75 via a not shown bus connector/slot system. CB 74 may comprise one or more single and/or multi-core host processors (HP) 12 and computer-readable/writable memory 21. Although not shown in the Figures, CB 74 also may comprise one or more chipsets (comprising, e.g., memory and/or input/output controller circuitry). One or more host processors 12 may be communicatively coupled via the one or more chipsets to memory 21 and/or CC 75.

CC 75 may comprise network controller circuitry (NCC) 118. NCC 118 may comprise buffer memory 60.

Alternatively or additionally, although not shown in the Figures, some or all of NCC 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, NCC 118 and/or CC 75. Many other alternatives are possible without departing from this embodiment. Although not shown in the Figures, node 20 may comprise, in whole or in part, respective components and/or functionality of node 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, circuitry, one or more CB, one or more CC, and/or memory. Although not shown in the Figures, node 10 may comprise a graphical user interface system that may comprise, e.g., a respective keyboard, pointing device, and display system that may permit a human user to input commands to, and monitor the operation of, node 10, node 20, and/or system 100.

Memory 21 and/or buffer memory 60 may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. One or more machine-readable program instructions may be stored in memory 21 and/or NCC 118. In operation of node 10, these instructions may be accessed and executed by one or more host processors 12 and/or NCC 118. When executed by one or more host processors 12, these one or more instructions may result in one or more communication protocol-related processes 42 and/or one or more communication protocol stack processes 31 being executed at least in part by one or more host processors 12, and becoming resident at least in part in memory 21. Also when executed by one or more host processors 12 and/or NCC 118, these one or more instructions may result in one or more host processors 12, NCC 118, one or more processes 42, one or more processes 31, and/or one or more components thereof, performing operations described herein as being performed by one or more host processors 12, NCC 118, one or more processes 42, one or more processes 31, and/or one or more components thereof in system 100.

In this embodiment, one or more processes 31 and one or more processes 42 may comprise, at least in part, mutually distinct processes. Alternatively, without departing from this embodiment, one or more processes 31 may be or comprise, at least in part, one or more processes 42, or vice versa.

In this embodiment, a portion of an entity may comprise all or less than all of the entity. Also, in this embodiment, a process, program, driver, operating system, and application may be used interchangeably, and may comprise and/or result at least in part from execution of one or more program instructions. In this embodiment, a communication protocol stack process and/or communication protocol-related process may comprise one or more processes involved, at least in part, in protocol processing. In this embodiment, protocol processing may involve, at least in part, receiving, transmitting, storing, translating, re-formatting, and/or modifying at least one portion of at least one packet. Also in this embodiment, a packet may comprise one or more symbols and/or values.

NCC 118 may exchange data and/or commands with one or more nodes 20 via one or more networks 50 in accordance with one or more communication protocols. For example, in this embodiment, these one or more protocols may be compatible with, e.g., an Ethernet protocol, Transmission Control Protocol/Internet Protocol (TCP/IP) protocol, User Datagram Protocol (UDP), and/or Real-time Protocol/Real-time Transport Control Protocol (RTP/RTCP).

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP protocol that may be utilized in system 100 may comply or be compatible with the protocols described in Internet Engineering Task Force (IETF) Request For Comments (RFC) 791 and 793, published September 1981. The UDP protocol that may be utilized in system 100 may comply or be compatible with the protocol described in IETF RFC 768, published 28 Aug. 1980. The RTP/RTCP protocol that may be utilized in system 100 may comply or be compatible with the protocol described in IETF RFC 3550, published July 2003. Although the following description of system 100 will proceed with particular reference being made to TCP, many different, additional, and/or other protocols (including, for example, those stated above) may be used for such data and/or command exchange without departing from this embodiment (e.g., earlier and/or later-developed versions of the aforesaid and/or other protocols).

In operation of system 100, one or more packets (P) 90A, 90B . . . 90N may be issued from node 20 to NCC 118 via one or more networks 50. NCC 118 may receive, at least in part, one or more packets 90A, 90B . . . 90N from one or more networks 50 at respective time intervals TI 1, TI 2 . . . TI N. For example, the time interval between the receipt by NCC 118 of one or more most recently previously received (i.e., prior to the receipt of one or more packets 90A) packets (not shown) and the receipt of one or more packets 90A may be equal to TI 1. Also for example, the time interval between the receipt by NCC 118 of one or more most recently previously received (i.e., prior to the receipt of one or more packets 90B) packets 90A and one or more packets 90B may be equal to TI 2. Additionally, for example, the time interval between the receipt by NCC 118 of one or more previously received (i.e., prior to the receipt of one or more packets 90N) packets (not shown) and the receipt of one or more packets 90N may be equal to TI N.

In this embodiment, one or more packets 90A, 90B . . . 90N may be associated, at least in part, with one or more processes 42. For example, one or more packets 90A, 90B . . . 90N may be or include data associated with, destined for, intended to be received, and/or processed, at least in part, by one or more packets 90A, 90B . . . 90N.

In this embodiment, NCC 118 may implement, at least in part, a relatively low-overhead technique to monitor incoming packet traffic and appropriately adaptively enable or disable a buffering mode of operation of NCC 118 in which one or more incoming packets (e.g., one or more packets 90A, 90B . . . 90N) may be buffered or not buffered, respectively, in buffer memory 60. Advantageously, in this embodiment, this may be carried out in such a way as to improve, for example, packet processing performance for one or more categories of packet traffic that may involve throughput sensitive workloads, and reduce power consumption involved with processing one or more other packet traffic categories.

Figure 3:
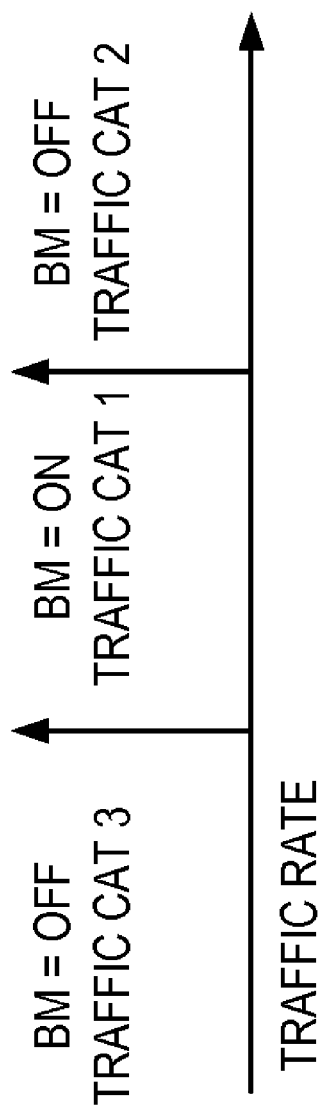
FIG. 3 illustrates features in an embodiment.

For example, as shown in FIG. 3, NCC 118 may implement, at least in part, this technique in this embodiment in such a way that the buffering mode (BM) is enabled (BM=ON) for one or more received packets that may be associated, at least in part, with a certain packet traffic category (TRAFFIC CAT 1). Conversely, according to this technique, NCC 118 may disable (BM=OFF) the buffer mode for one or more received packets that may be associated, at least in part, with two other respective packet traffic categories (TRAFFIC CAT 2 and TRAFFIC CAT 3). In this embodiment, one of these two other packet traffic categories (TRAFFIC CAT 2) may be relatively faster (e.g., have a relatively higher packet traffic rate) and/or of higher priority than the certain packet traffic category (TRAFFIC CAT 1). However, in this embodiment, the other of these two other packet traffic categories (TRAFFIC CAT 3) may be relatively slower (e.g., have a relatively lower packet traffic rate) and/or of lower priority than the certain packet traffic category (TRAFFIC CAT 1).

For example, the certain packet traffic category (TRAFFIC CAT 1) may involve video streaming, file transfer, and/or similar types of traffic. However, the relatively slower and/or lower priority traffic category (TRAFFIC CAT 3) may involve other types of traffic, such as, world wide web browsing, voice-over-IP, and/or similar types of traffic. Additionally, the relatively faster and/or higher priority traffic category (TRAFFIC CAT 2) may involve benchmark testing, throughput stress testing, and/or similar types of traffic, in which, for example, throughput delays may deleteriously affect the results of the testing. Such testing may be related to, for example, testing in which a sender pings the receiver and awaits response from the receiver before taking further action (e.g., sending another ping), script execution and/or local file copy testing, etc.

Figure 2:
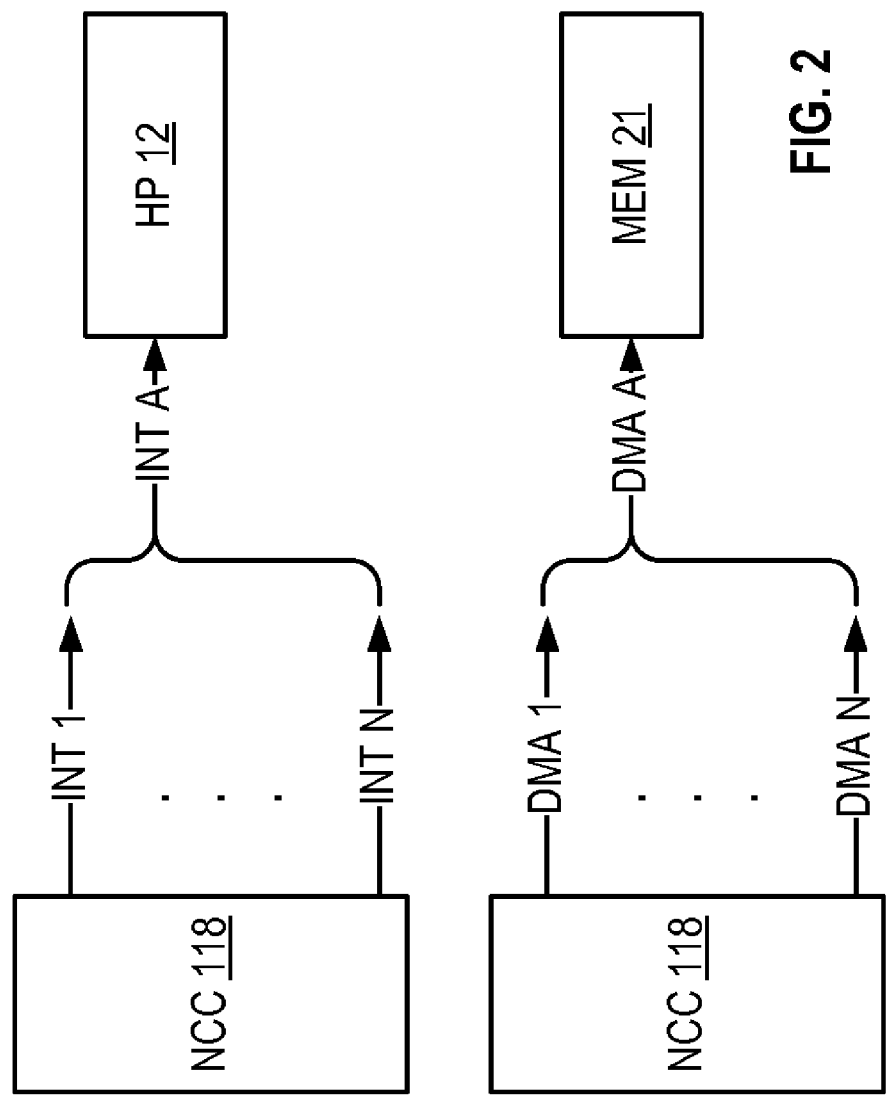
FIG. 2 illustrates operations in an embodiment.

More generally, as a result of this technique, the buffering mode of operation of NCC 118 may be disabled when the traffic is relatively faster and/or of higher priority (e.g., TRAFFIC CAT 2), for example, in order to accomplish relatively higher throughput performance. However, the buffering mode of operation of NCC 118 also may be disabled when the traffic is relatively slower and/or of lower priority (e.g., TRAFFIC CAT 3), for example, in order to avoid unnecessary processing/throughput latency. Conversely, the buffering mode may be enabled when the traffic rate is categorized (e.g., in TRAFFIC CAT 1) between these two traffic categories (TRAFFIC CAT 2 and TRAFFIC CAT 3), for example, in order to reduce the rate of interrupt issuance from NCC 118 to one or more host processors 12, thereby permitting one or more host processors 12 and/or other components in node 10 to enter and/or remain in a relatively lower power state (e.g., relative to a fully powered-on state). When the buffering mode is enabled, one or more incoming packets received by NCC 118 while the buffering mode is enabled, may be buffered, at least in part, in buffer memory 60. Conversely, when the buffering mode is disabled, one or more incoming packets received by NCC 118 while the buffering mode is disabled, and any packets previously buffered, at least in part, in buffer memory 60, may be transferred to memory 21 from NCC 118 in one or more direct memory access (DMA) operations (e.g., DMA A in FIG. 2). Contemporaneously with these one or more DMA operations DMA A, NCC 118 may issue one or more interrupts (e.g., INT A in FIG. 2) to one or more host processors 12 to signal the DMA transfer, at least in part, from the NCC 118 to the memory 21. As a result of and/or in response to, at least in part, the one or more interrupts INT A, if one or more host processors 12 are currently in a reduced power mode of operation, one or more host processors 12 may commence operating in a relatively higher power mode of operation (e.g., a fully powered-up mode of operation) and may execute one or more processes 42 in this relatively higher power mode of operation. One or more processes 42 may access and process the one or more packets transferred to memory 21 by circuitry via one or more operations DMA A.

In this embodiment, one or more operations DMA A may embody, at least in part, a coalescing of one or more DMA operations (e.g., DMA 1 ... DMA N in FIG. 2) and/or one or more interrupts INT A may embody, at least in part, one or more interrupts (e.g., INT 1 ... INT N in FIG. 2) that otherwise may have been carried out and/or generated if NCC 118 had not previously been operating in its buffering mode of operation. For example, if NCC 118 had not previously been in its buffering mode of operation, operations DMA 1 ... DMA N and/or interrupts INT 1 ... INT N may have been carried out and/or generated to transfer and/or signal the transfer, respectively (e.g., on a packet-by-packet basis), one or more packets received by NCC 118. Advantageously, in this embodiment, the above features may permit reduction in the power consumption of node 10, coalescing of one or more such interrupts, and/or coalescing of one or more associated direct memory access DMA transfer operations, from NCC 118 to one or more host processors 12.

Figure 4:
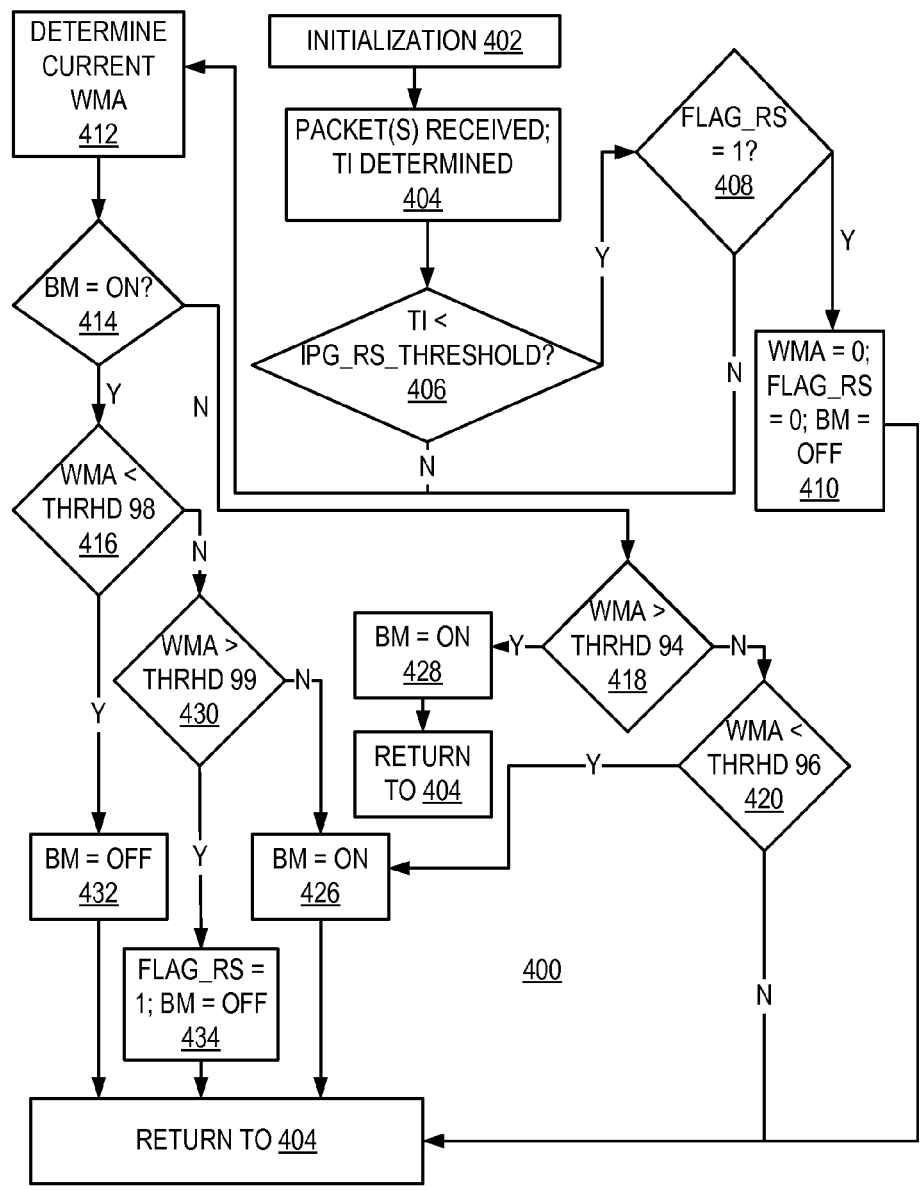
FIG. 4 illustrates operations in an embodiment.

For example, with particular reference to FIGS. 1 and 4, the technique of this embodiment may be implemented, at least in part, by NCC 118 carrying out, at least in part, one or more operations 400. That is, as a result and/or as part of one or more operations 400, NCC 118 may determine, at least in part, whether to buffer, at least in part, one or more packets 90A . . . 90N. This determination, at least in part, that may result and/or be part of one or more operations 400 may be based at least in part upon whether a weighted moving average (WMA) 92 exceeds a threshold value 94 but is less than another threshold value 96. WMA 92 may be determined (and re-determined), at least in part, on a received packet-by-packet basis, based at least in part upon one or more time intervals TI 1 . . . TI N between the receptions of one or more packets 90A . . . 90N by NCC 118. In this embodiment, if the WMA 92 determined, at least in part, by NCC 118 is between thresholds 94 and 96, NCC 118 may enable, enter, or remain in its buffering mode of operation. Conversely, if the WMA 92 determined, at least in part, by NCC 118 is greater than another threshold value 99 that is relatively higher than threshold 96, or the WMA 92 is less than an additional threshold value 98 that is less than threshold 94, NCC 118 may disable or exit its buffering mode of operation.

However, if the determined WMA 92 is between thresholds 98 and 94, or the WMA 92 is between thresholds 96 and 99, NCC 118 may remain in its present mode of operation. That is, for example, if NCC 118 is currently in its buffering mode of operation, and the WMA 92 is between thresholds 98 and 94 or is between thresholds 96 and 99, then NCC 118 may remain in the buffering mode. Conversely, if the buffering mode of NCC 118 is currently disabled, and the WMA 92 is between thresholds 98 and 94 or is between thresholds 96 and 99, then the buffering mode of NCC 118 may remain disabled. Thus, NCC 118 may determine, at least in part, whether to buffer, at least in part, one or more packets based at least in part upon whether (1) the NCC 118 is currently in its buffering mode and/or (2) the WMA 92 is between thresholds 98 and 94 or the WMA 92 is between thresholds 96 and 99.

In order to implement these and other features, in this embodiment, prior to receiving, at least in part, one or more packets 90A . . . 90N, NCC 118 may perform, at least in part, an initialization operation 402. As part of operation 402, NCC 118 may (1) initialize WMA 92 to have an initial, empirically predetermined value that is large enough to appropriately balance power-saving and performance throughput concerns, (2) place itself into an initial mode of operation in which the buffering mode is disabled, and (3) initialize a special variable (FLAG_RS) to a "set" value (i.e., 1 or unity).

As will be seen, this special variable is intended to help ensure that, when a packet stream in TRAFFIC CAT 2 is starting to be received by NCC 118 (e.g., following commencement of operations 400, and/or after an idle period in which no packets have been received), NCC 118 correctly classifies the packet stream as being associated with this throughput-sensitive category, and the buffering mode of NCC 118 is appropriately disabled. For example, the FLAG_RS variable may be set to indicate that a most recently determined (or initialized) value of WMA 92 is in the right side of the graph shown in FIG. 1 (e.g., is closer to threshold 99 than threshold 98, and/or exceeds threshold 99). Additionally, NCC 118 may initially disable (e.g., as part of operation 402) its buffering mode of operation in order to help ensure that an initially received packet that may be classified in TRAFFIC CAT 2 will not be delayed (e.g., as may have occurred if the NCC 118 had been initially placed in the buffering mode of operation).

After executing operation 402, NCC 118 may receive, at least in part, one or more packets (e.g., one or more packets 90A) and may determine, at least in part, the time interval (e.g., TI 1) between the one or more received packets 90A and one or more most recently previously received packets (not shown), as illustrated by operation 404. Alternatively, if one or more packets 90A are the first one or more packets received after the commencement of execution of operations 400, time interval TI 1 may be equal to the time interval following the commencement of operations 400.

After execution of operation 404, NCC 118 may determine, at least in part, whether the time interval TI 1 is less than an empirically pre-determined threshold value (IPG_RS_THRESHOLD) that may indicate that NCC 118 may be receiving a packet stream categorized in TRAFFIC CAT 2 (see operation 406). If, as a result of operation 406, NCC 118 determines, at least in part, that time interval TI 1 is less than this threshold value, NCC 118 may determine, at least in part, whether the FLAG_RS variable is currently set (see operation 408). If this variable is currently set, NCC 118 may (1) set WMA 92 equal to zero, (2) set FLAG_RS to zero, (3) disable (or maintain the disabled state of) its buffer mode, and (4) when one or more other packets (e.g., one or more packets 90B) are received, continue execution of operations 400 with operation 404.

Conversely, if (1) NCC 118 determines, at least in part, that the FLAG_RS variable is currently not set (i.e., is equal to zero), or (2) if as a result of operation 406, NCC 118 determines, at least in part, that time interval TI 1 is not less than the IPG_RS_THRESHOLD variable, NCC 118 may determine, at least in part, the current value of WMA 92 (see operation 412). NCC 118 may determine and/or calculate, at least in part, the current value of WMA 92, in accordance with the following formula:

Current value of $WMA = PWMA*A + CTI*(1-A)$, where

PWMA is the most recent previously determined value of WMA, A is an empirically pre-determined weighting value, and CTI is the value of the time interval between the receipt of the most recently received packet and the receipt of the next most recently received packet.

In this embodiment, the value of A may be empirically determined to appropriately select how rapidly the WMA is to change depending upon the CTI, and in the present example, may be equal to 0.9. Also in this example, CTI may be equal to TI 1, and PWMA may be equal to the initial value set for WMA (i.e., as part of operation 402).

After executing operation 412, NCC 118 may determine, at least in part, whether the NCC 118 is currently in its buffering mode of operation (see operation 414). If NCC 118 is currently in its buffering mode of operation, NCC 118 may execute operation 416. Conversely, if the buffering mode of operation of NCC 118 is currently disabled, NCC 118 may execute operation 418.

As part of operation 416, NCC 118 may determine, at least in part, whether the current WMA (i.e., calculated as a result of operation 412) is less than threshold 98. If the current WMA is less than threshold 98, then NCC 118 may execute operation 432. Conversely, if the current WMA is not less than threshold 98, then NCC 118 may execute operation 430.

As part of operation 432, NCC 118 may exit its buffering mode of operation. After NCC 118 receives, at least in part, one or more other packets 90B, NCC 118 may continue execution of operations 400 with operation 404.

As part of operation 430, NCC 118 may determine, at least in part, whether the current WMA is greater than threshold 99. If the current WMA is greater than threshold 99, then NCC 118 may set the FLAG_RS variable, NCC 118 may disable its buffering mode of operation (see operation 434), and NCC 118 may continue (after receipt of one or more other packets 90B) executing operations 400 with operation 404. Conversely, if the current WMA is not greater than threshold 99, then NCC 118 may continue in its buffering mode of operation (see operation 426), and may continue executing operations 400 (after receipt of one or more packets 90B) with operation 404.

As part of operation 418, NCC 118 may determine, at least in part, whether the current WMA is greater than threshold 94. If the current WMA is greater than threshold 94, then NCC 118 may enable its buffer mode of operation (see operation 428) and may continue its execution of operations 400 (after receipt of one or more packets 90B) with execution of operation 404.

Conversely, if the current WMA is not greater than threshold 94, then NCC 118 may determine, at least in part, whether the current WMA is less than threshold 96. If the current WMA is less than threshold 96, then NCC 118 may enter its buffering mode of operation (see operation 426), and may continue its execution of operations 400 (after receipt of one or more packets 90B) with execution of operation 404. Conversely, if the current WMA is not less than the threshold 96, then NCC 118 may continue with its buffering mode disabled, and may continue its execution of operations 400 (after receipt of one or more packets 90B) with execution of operation 404.

Threshold values 94, 96, 98, and 99 may be empirically selected so as to permit the buffering mode of NCC 118 to be adaptively enabled and disabled in such as a way as to achieve appropriate improvements in power efficiency and packet throughput, while preventing the NCC 118 from undergoing frequent oscillations between enablement/disablement of its buffering mode. Additionally, one or more processes 31 may be executed, at least in part, by NCC 118 and/or one or more host processors 12. One or more processes 31 may carry out at least a portion of operations 400. For example, one or more processes 31 may implement, at least in part, one or more protocol layers (not shown). Additionally or alternatively, NCC 118 may be or comprise, at least in part, a system-on-chip that may implement, at least in part, operations 400.

Thus, an embodiment may include circuitry to be comprised in a node. The node may be communicatively coupled to a network and may include a host processor to execute at least one communication protocol-related process. The circuitry may determine, at least in part, whether to buffer, at least in part, at least one packet received from the network based at least in part upon whether a weighted moving average exceeds a first threshold and is less than a second threshold. The average may be determined based at least in part upon one or more time intervals between one or more packet receptions from the network.

Advantageously, the foregoing features of this embodiment may permit this embodiment to exhibit reduced power consumption, improved power utilization efficiency and/or efficacy, and improved packet traffic throughput. Further advantageously, this embodiment may not undergo frequent, non-deterministically timed power state transitions/oscillations.

What is claimed is:

1. An apparatus comprising:
    circuitry to be comprised in a first node, the node to be communicatively coupled to a network and including a host processor to execute at least one communication protocol-related process, the circuitry to determine, at least in part, whether to buffer, at least in part, at least one packet received from the network based at least in part upon whether a weighted moving average exceeds a first threshold and is less than a second threshold, the average being determined based at least in part upon one or more time intervals between one or more packet receptions from the network;

wherein:

a third threshold is less than the first threshold;

a fourth threshold is greater than the second threshold; and the circuitry is to determine, at least in part, whether to buffer, at least in part, the at least one packet based at least in part upon whether the circuitry is currently in a packet buffering mode of operation, and whether the average is one of:

between the third threshold and the first threshold, and between the fourth threshold and the second threshold.

2. The apparatus of claim 1, wherein:

the circuitry is to determine, at least in part, whether to buffer, at least in part, the at least one packet based at least in part upon whether (1) a last time interval between receipt of the at least one packet and a preceding received packet is less than a predetermined threshold and (2) a previously determined value of the average exceeds another predetermined threshold.

3. The apparatus of claim 1, wherein:

if the circuitry determines, at least in part, to buffer the at least one packet, the circuitry is also to coalesce one or more interrupts to be issued to the host processor and one or more direct memory access operations; and if the circuitry is to buffer, at least in part, the at least one packet if the at least one packet is associated at least in part with a first packet traffic category, the first packet traffic category being at least one of relatively slower and lower priority than a second packet traffic category and at least one of relatively faster and higher priority than a third packet traffic category.

4. The apparatus of claim 1, wherein:

determination, at least in part, of whether to buffer, at least in part, the at least one packet is performed, at least in part, by one or more processes executed, at least in part, by the circuitry; a circuit card comprises, at least in part, the circuitry; and the node comprises a circuit board to be coupled to the circuit card.

5. A method comprising:

determining, at least in part, by circuitry whether to buffer, at least in part, at least one packet received from a network based at least in part upon whether a weighted moving average exceeds a first threshold and is less than a second threshold, the circuitry to be comprised in a node, the node to be communicatively coupled to the network and including a host processor to execute at least one communication protocol-related process, the average being determined based at least in part upon one or more time intervals between one or more packet receptions from the network;

wherein:

a third threshold is less than the first threshold;

a fourth threshold is greater than the second threshold; and the circuitry is to determine, at least in part, whether to buffer, at least in part, the at least one packet based at least in part upon whether the circuitry is currently in a packet buffering mode of operation, and whether the average is one of: between the third threshold and the first threshold, and between the fourth threshold and the second threshold.

6. The method of claim 5, wherein: the circuitry is to determine, at least in part, whether to buffer, at least in part, the at least one packet based at least in part upon whether (1) a last time interval between receipt of the at least one packet and a preceding received packet is less than a predetermined threshold and (2) a previously determined value of the average exceeds another predetermined threshold.

7. The method of claim 5, wherein:

if the circuitry determines, at least in part, to buffer the at least one packet, coalescing by the circuitry one or more interrupts to be issued to the host processor and one or more direct memory access operations; and if the circuitry is to buffer, at least in part, the at least one packet if the at least one packet is associated at least in part with a first packet traffic category, the first packet traffic category being at least one of relatively slower and lower priority than a second packet traffic category and at least one of relatively faster and higher priority than a third packet traffic category.

8. The method of claim 5, wherein:

determination, at least in part, of whether to buffer, at least in part, the at least one packet is performed, at least in part, by one or more processes executed, at least in part, by the circuitry; a circuit card comprises, at least in part, the circuitry; and the node comprises a circuit board to be coupled to the circuit card.

9. Computer-readable memory storing one or more instructions that when executed by a machine result in performance of operations comprising:

determining, at least in part, by circuitry whether to buffer, at least in part, at least one packet received from a network based at least in part upon whether a weighted moving average exceeds a first threshold and is less than a second threshold, the circuitry to be comprised in a node, the node to be communicatively coupled to the network and including a host processor to execute at least one communication protocol-related process, the average being determined based at least in part upon one or more time intervals between one or more packet receptions from the network;

wherein:

a third threshold is less than the first threshold;

a fourth threshold is greater than the second threshold; and the circuitry is to determine, at least in part, whether to buffer, at least in part, the at least one packet based at least in part upon whether the circuitry is currently in a packet buffering mode of operation, and whether the average is one of: between the third threshold and the first threshold, and between the fourth threshold and the second threshold.

10. The memory of claim 9, wherein:

the circuitry is to determine, at least in part, whether to buffer, at least in part, the at least one packet based at least in part upon whether (1) a last time interval between receipt of the at least one packet and a preceding received packet is less than a predetermined threshold and (2) a previously determined value of the average exceeds another predetermined threshold.

11. The memory of claim 9, wherein:

if the circuitry determines, at least in part, to buffer the at least one packet, coalescing by the circuitry one or more interrupts to be issued to the host processor and one or more direct memory access operations; and if the circuitry is to buffer, at least in part, the at least one packet if the at least one packet is associated at least in part with a first packet traffic category, the first packet traffic category being at least one of relatively slower and lower priority than a second packet traffic category and at least one of relatively faster and higher priority than a third packet traffic category.

12. The memory of claim 9, wherein:
determination, at least in part, of whether to buffer, at least in part, the at least one packet is performed, at least in part, by one or more processes executed, at least in part, by the circuitry; a circuit card comprises, at least in part, the circuitry; and the node comprises a circuit board to be coupled to the circuit card.

* * * * *